Sept. 1, 1931.   E. W. BRANDENSTEIN   1,821,827
SELF PROPELLED VEHICLE
Filed Sept. 4, 1928
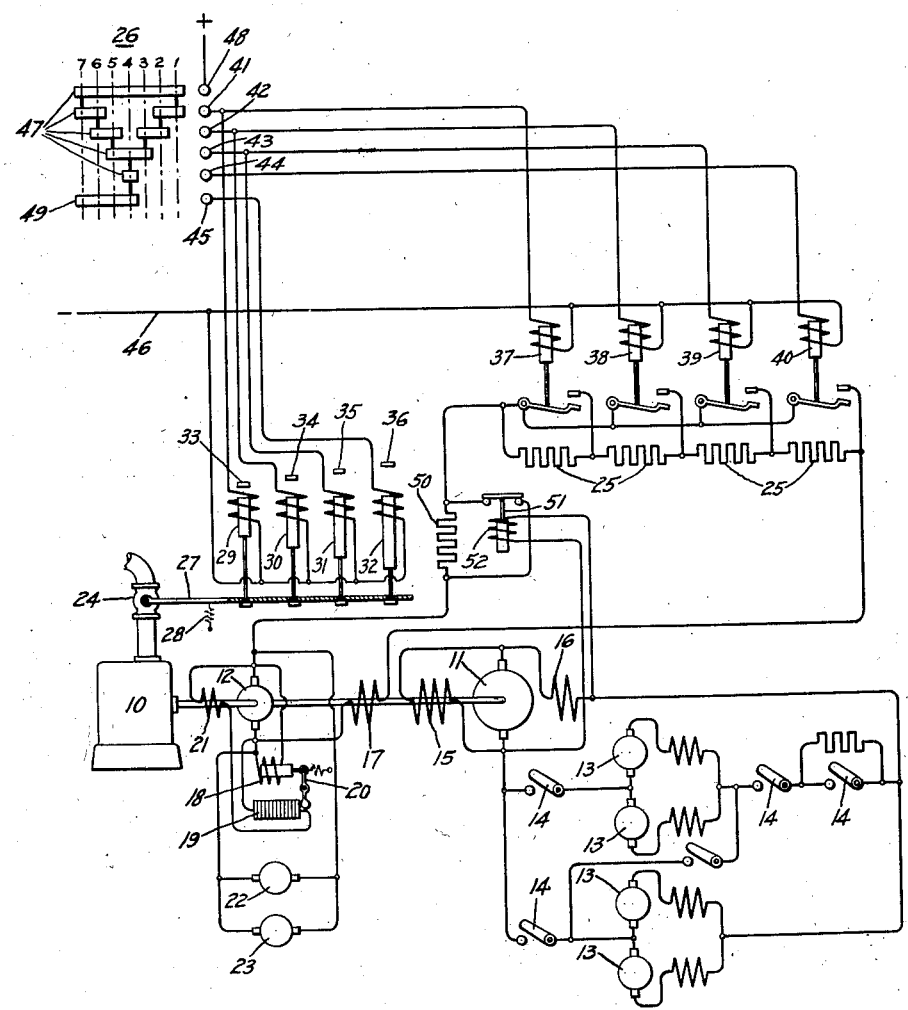
Inventor:
Erroll W. Brandenstein,
by Charles E. Tullar
His Attorney.

Patented Sept. 1, 1931

1,821,827

UNITED STATES PATENT OFFICE

ERROL W. BRANDENSTEIN, OF SCHENECTADY, NEW YORK, ASSIGNOR TO GENERAL ELECTRIC COMPANY, A CORPORATION OF NEW YORK

SELF PROPELLED VEHICLE

Application filed September 4, 1928. Serial No. 303,724.

My invention relates to self-propelled vehicles wherein an internal combustion engine is arranged to drive a generator which in turn supplies current to electric motors connected to the axles of the vehicle.

It has been the practice heretofore, in vehicles of this character, to control the same entirely by manipulation of the engine throttle which varied the power output of the engine-generator set without varying the excitation of the generator in accordance with variations in the load or opening of the throttle. In order to avoid stalling of the engine it was necessary to design the generator so that the voltage decreased rapidly with a decrease in speed thereof. As a result upon reducing the throttle to decrease the power output of the engine-generator set the entire range of variation of power output was obtained over a comparatively small variation in speed of the engine. This made it necessary to operate the engine at comparatively high speed when it was delivering a small proportion of its maximum power, which caused a substantial increase of maintenance costs.

The engines used in these vehicles are generally designed so that the torque developed thereby is substantially proportional to the opening of the throttle, and for any particular opening of the throttle the torque is approximately constant throughout the range of variations in operating speed of the engine. As power output in the engine was controlled entirely by manipulation of the throttle, full torque of the engine could not be obtained at reduced speed thereof, and the throttle could not be fully opened when the engine was delivering less than maximum power. This made the engine inefficient when delivering less than maximum power output as the efficiency of the engine decreases with reduction in the throttle opening.

An object of my invention is to provide a vehicle of this character in which the range of variation of power output of the engine is obtained over a very wide range in speed of operation thereof, so that when the engine is delivering a small proportion of its maximum power output it will operate at a small proportion of the normal speed corresponding with maximum power and maximum throttle opening. I accomplish this by providing a vehicle comprising an engine having a controlling device for varying the torque of the engine, arranging a generator to be driven by said engine having motors connected thereto for propelling the vehicle, and providing an arrangement for varying the excitation of the generator in response to actuation of the engine controlling device.

Another object of my invention is to increase the efficiency of the engine when it is delivering less than its maximum power. I do this by providing an arrangement for varying the excitation of the generator independently of the actuation of the engine controlling device after a predetermined adjustment thereof. This enables me to reduce the power output of the engine generator set by decreasing the speed thereof without decreasing the torque or throttle opening of the engine which is the most efficient method of obtaining a reduction in its power output. I prevent excessive speed of the vehicle in this construction by providing an arrangement controlled by an electrical characteristic of the generator for decreasing the excitation thereof.

My invention will be more fully set forth in the following description referring to the accompanying drawing and the features of novelty which characterize my invention will be pointed out with particularity in the claims annexed to and forming a part of this specification.

In the drawing the single figure diagrammatically illustrates a self-propelled vehicle embodying my invention.

Referring to the drawing, the vehicle shown comprises an engine 10 which is mechanically connected to a generator 11 and an exciter 12 by a shaft or other suitable means, and driving motors 13, which are mechanically connected to the driving wheels of the vehicle, are adapted to be connected across the terminals of the generator 11 in series or parallel by the contacts, indicated at 14, of a manual or automatic controller (not shown). The excitation system of the generator may be of any suitable form but in this particular instance it comprises a shunt field exciting winding 15, a differential series field exciting winding 16 and a separately excited field exciting winding 17. I excite the field exciting winding 17 by connecting the exciter 12 across the same and provide means for maintaining the voltage of the exciter substantially constant throughout the range of variation in speed and load thereon. The means for maintaining constant voltage shown comprises a voltage coil 18 connected across the terminals of the exciter 12 which varies the compression of a carbon pile resistor 19 by the armature spring and lever mechanism indicated at 20, so as to increase the resistance at 19 in proportion to the increase in the voltage of the exciter 12, and to decrease the resistance at 19 in proportion to a decrease in the voltage of the exciter. The carbon pile resistor 19 is connected in series with the shunt field 21 of the exciter so that the variation in the compression of the carbon pile resistor maintains the voltage of the exciter substantially constant. In vehicles of this character heretofore constructed difficulty has been experienced in obtaining a suitable source of voltage for operating auxiliary devices of the vehicle when the engine was idling or lightly loaded because under this condition the voltage of the generator or exciter decreased so much that it was not sufficient to operate the motors for maintaining the necessary air pressure in the braking system, or to circulate an adequate supply of air for cooling the engine. It is therefore, of particular advantage to provide an arrangement so that the voltage of the exciter remains substantially constant throughout the range of variation in speed and load thereon, as it provides a suitable source of voltage for operating auxiliary devices, such as the air compressor motor 22 of the braking system and the blower motor 23 of the engine cooling system which are connected thereto.

In accordance with my invention I vary the electrical characteristic of the generator so that it will load the engine to the best advantage upon variation in load on the vehicle, and I do this by providing a device for controlling the torque exerted by the engine and for varying the excitation of the generator in response to actuation of the engine controlling device.

In the construction illustrated, the torque of the engine 10 is controlled by a throttle 24 which controls the admission of motive fluid to the engine, and the excitation of the generator is controlled by a resistance 25 connected in series with the exciter 12 and the exciting field winding 17. The excitation of the generator is varied in response to varying the opening of the throttle by providing a controller 26 which simultaneously opens and closes the throttle 24 and correspondingly increases and decreases the excitation of the generator 11 by varying the resistance 25 in series with the exciter 12 in inverse proportion to the throttle opening. The throttle is operated and the resistance 25 is varied in this manner by providing the throttle 24 with a lever 27 which is moved to open and close the throttle against the action of a spring 28 by relays 29, 30, 31 and 32. The armatures of these relays are connected to the lever 27 and provided with stops 33, 34, 35 and 36 arranged so that the throttle is opened in four steps upon successive energization of the operating coils of the relays. The resistance 25 is varied by contactors 37, 38, 39 and 40 which short circuit portions thereof in four steps upon successive energization of the operating coils of the contactors. The operating coils of these contactors are connected to fixed contacts 41, 42, 43 and 44 respectively of the controller 26, and the operating coils of the relays 29, 30, 31 and 32 are connected to fixed contacts 41, 42, 43 and 45 respectively of the controller. One terminal of each of the operating coils of the relays and contacts are connected to one terminal 46 of a source of voltage and the controller is provided with interconnected movable contacts 47 arranged to complete the circuit between the other terminal 48 of this source of voltage and the operating coils so as to energize the relays and contactors and to fully open the throttle and increase the excitation of the generator to a maximum in four steps upon moving the controller 26 from the position shown through positions 1, 2 and 3 to position 4. These movable contacts are also arranged to deenergize the operating coils of the contactors 29, 30, 31 and 32 successively in moving the controller from position 4 to position 7. In position 4 a movable contact 49 engages the fixed contact 45 and remains in engagement therewith so as to maintain the throttle 24 fully open when the controller is moved through positions 4 to 7. By this construction of the controller the excitation of the generator can be varied independently of the throttle for obtaining a fraction of the maximum power output of the engine required with fully open throttle and maximum torque which is the most efficient mode of operation of the engine.

During the operation of the vehicle if it is heavily loaded or ascending a grade the operator would move the controller to position 6 or 7 to obtain the maximum power output of the engine. If under this condition the grade should decrease or the load on the vehicle be decreased, the vehicle would tend to increase the speed quite rapidly, and in order to avoid excessive speed the operator would move the controller toward the position 1. The initial effect of this movement would, however, be to successively energize contacts 37, 38 and 39 which would decrease the amount of resistance in the exciter circuit and correspondingly increase the voltage of the generator 11 so as to increase the speed of the vehicle. This would be likely to confuse the operator because he would expect a decrease in speed of the vehicle upon moving the controller 26 toward the off-position. In order to avoid this difficulty I arrange a resistor 50 in series with the exciter 12 and the field exciting winding 17 which is normally short circuited by a contactor 51 connected across the same having an operating coil 52 connected across the generator 11. The relay 51 is arranged so that when the controller 26 is in position 6 or 7. and the speed of the vehicle exceeds a predetermined amount, the voltage of the generator 11 will be such as to open the contactor 51 and cause a substantial decrease in the voltage of the generator which prevents excessive speeding of the vehicle. The voltage of the generator 11 does not under ordinary conditions of operation become high enough to open the contactor 51 unless the vehicle is operating at an excessive speed so that this arrangement does not interfere with the normal operation of the vehicle.

In the operation of the vehicle which I have described, when the vehicle is fully loaded so as to require a maximum power output of the engine, the operator starts the vehicle by moving the controller 26 from the position shown through all the positions of the controller to position 7. In moving the controller through positions 1, 2 and 3 to position 4, it will be observed that the throttle 24 is fully opened and the resistance 25 is short circuited in four successive steps which increases the torque of the engine to a maximum and, at the same time, increases the excitation of the generator 11 to a maximum by decreasing the resistance in series with the exciter 12. In this position of the controller 26 the engine will be developing full torque, as the throttle is fully open and the torque of the engine is substantially proportional to the throttle opening. Full excitation of the generator 11 under this condition of load maintains the engine at approximately half speed, and the power output of the engine-generator set is further increased by moving the controller 26 from position 4 toward position 7 which decreases the excitation of the generator and increases the speed of the engine. During this movement of the controller the movable contact 49 of the controller 26 remains in engagement with the contact 45 so that the relay 32 is energized which maintains the throttle 24 fully open. At the same time the operating coils of the contactors 40, 39, 38 and 37 are deenergized which successively places portions of the resistance 25 in circuit with the exciter 12 and decreases the excitation of the generator. This causes the speed of the engine to increase to full-speed corresponding to its maximum power output. Increasing the speed of the engine by decreasing the excitation of the generator 11 in this manner increases the power output of the engine because the torque remains substantially constant as the throttle remains fully open, and the power output is equal to the product of the torque and the speed of the engine.

It will be understood that by moving the controller 26 from the position shown through all the intermediate positions of the controller to position 7 the engine-generator set will be delivering full power to the driving motors of the vehicle. If the load on the vehicle should suddenly decrease, as by a decrease in the grade over which the vehicle is moving, the speed thereof would correspondingly increase. In order to limit the increase in speed of the vehicle, the operator would move the controller 26 from position 7 toward position 1, which will increase the excitation of the generator as it is moved through positions 6, 5 and 4 by successively energizing contactors 37, 38 and 39, which will tend to further increase the speed of the vehicle. However, moving the controller 26 toward the off-position under these circumstances and increasing the excitation of the generator 11 will cause an abnormal rise in voltage of the generator which will open the contactor 51 and cause the resistance 50 to decrease the excitation of the generator 11 to such an extent that the speed of the vehicle will be effectively limited. Of course, after the controller passes position 4 the contact 49 is out of engagement with contact 45 so that opening of the throttle 24 and excitation of the generator will be simultaneously decreased, and the vehicle will be completely under the control of the operator.

In the event the vehicle were lightly loaded so that operation thereof required only a small proportion of the maximum power output of the engine, it would only be necessary for the operator to move the controller 26 over the first few positions thereof to obtain the required power. The excitation of the generator 11 under this condition of loading of the vehicle would be such as to cause the engine to develop the required power at much lower speeds than vehicles of this character as heretofore constructed. By adjusting the controller 26 from positions 4 to 7 the excitation of the generator 11 can be varied independently of the throttle so as to obtain the power output required with full throttle opening.

Various modifications of the vehicle which I have described will occur to those skilled in the art so that I do not desire my invention to be limited to the particular arrangement disclosed, and I intend in the appended claims to cover all modifications which do not depart from the spirit and scope of my invention.

What I claim as new and desire to secure by Letters Patent of the United States, is:

1. A vehicle comprising an engine, a controlling device for varying the torque exerted by said engine, a generator driven by said engine having a motor connected thereto for propelling the vehicle, an excitation system for said generator, means responsive to actuation of said engine controlling device for varying the excitation of said generator and for varying the excitation of said generator independently of said engine controlling device after a predetermined adjustment of the latter, and means controlled by an electrical characteristic of said generator for decreasing the excitation thereof so as to prevent excessive speeding of the vehicle.

2. A vehicle comprising an engine having a throttle for controlling the admission of motive fluid thereto, a generator driven by said engine having a motor connected thereto for propelling the vehicle, an excitation system for said generator including a variable resistor, means for actuating said throttle to open and close the same and vary the torque of said engine, means dependent upon said throttle actuating means for varying said resistor to increase and decrease the excitation of said generator in accordance with the opening and closing of said throttle, and means controlled by the voltage of said generator for decreasing the excitation thereof so as to prevent excessive speeding of the vehicle.

3. A vehicle comprising an engine having a throttle for controlling the admission of motive fluid thereto, a generator driven by said engine having a motor connected thereto for propelling the vehicle, an excitation system for said generator including a variable resistor, a plurality of contactors arranged to vary said resistor, a plurality of relays arranged to open and close said throttle, means including a controller for simultaneously energizing said relays and said contactors so as to increase and decrease the excitation of said generator in accordance with the opening and closing of said throttle and for varying the excitation of said generator independently of the movement of said throttle after the same has been opened a predetermined degree, and means controlled by the voltage of said generator for decreasing the excitation thereof so as to prevent excessive speeding of the vehicle.

4. A vehicle comprising an engine having a throttle for controlling the admission of motive fluid thereto, a generator driven by said engine having a motor for propelling the vehicle connected thereto, an excitation system for said generator including a variable resistor, a field exciting winding and an exciter connected in series, a plurality of contactors arranged to short circuit portions of said resistor so as to vary the excitation of said generator, a plurality of relays arranged to open and close said throttle, and means including a controller for simultaneously energizing said relays and said contactors so as to increase and decrease the excitation of said generator in accordance with the opening and closing of said throttle and for controlling said contactors to vary the excitation of said generator independently of the movement of said throttle after the same has been opened a predetermined degree.

5. A vehicle comprising an engine having a throttle for controlling the admission of motive fluid thereto, a generator driven by said engine having a motor for propelling the vehicle connected thereto, an excitation system for said generator including a variable resistor, a field exciting winding and an exciter connected in series, a plurality of contactors arranged to short circuit portions of said resistor so as to vary the excitation of said generator, a plurality of relays arranged to open and close said throttle, means including a controller for simultaneously energizing said relays and said contactors so as to increase and decrease the excitation of said generator in accordance with the opening and closing of said throttle and for controlling said contactors to vary the excitation of said generator independently of the movement of said throttle after the same has been opened a predetermined degree, and means controlled by the voltage of said generator for decreasing the excitation of said generator so as to prevent excessive speeding of the vehicle.

In witness whereof, I have hereunto set my hand this 1st day of September, 1928.

ERROL W. BRANDENSTEIN.